US008210601B2

(12) United States Patent
Terada et al.

(10) Patent No.: US 8,210,601 B2
(45) Date of Patent: Jul. 3, 2012

(54) VEHICLE BODY STRUCTURE

(75) Inventors: Sakayu Terada, Hiroshima (JP); Miho Kowaki, Hiroshima (JP)

(73) Assignee: Mazda Motor Corporation (JP)

( * ) Notice: Subject to any disclaimer, the term of this patent is extended or adjusted under 35 U.S.C. 154(b) by 368 days.

(21) Appl. No.: 12/500,219

(22) Filed: Jul. 9, 2009

(65) Prior Publication Data

US 2010/0066124 A1    Mar. 18, 2010

(30) Foreign Application Priority Data

Sep. 18, 2008  (JP) ................................. 2008-239396
Sep. 19, 2008  (JP) ................................. 2008-241635

(51) Int. Cl.
*B60R 19/34*    (2006.01)

(52) U.S. Cl. .................................. 296/187.09; 293/133

(58) Field of Classification Search ............. 296/187.09, 296/187.03, 187.12, 193.08, 193.09, 187.1; 293/132, 133

See application file for complete search history.

(56) References Cited

U.S. PATENT DOCUMENTS

| 4,702,515 | A  | * | 10/1987 | Kato et al. ............... 296/187.01 |
| 5,984,403 | A  | * | 11/1999 | Kuroda ..................... 296/187.03 |
| 6,474,709 | B2 | * | 11/2002 | Artner ........................... 293/133 |
| 6,648,385 | B2 | * | 11/2003 | Frank ............................ 293/133 |
| 6,705,668 | B1 | * | 3/2004  | Makita et al. ............. 296/187.03 |
| 6,863,321 | B2 | * | 3/2005  | Jonsson et al. ................ 293/102 |
| 7,357,432 | B2 | * | 4/2008  | Roll et al. ...................... 293/133 |
| 7,533,913 | B2 | * | 5/2009  | Bae ................................ 293/133 |
| 2003/0218341 | A1 | * | 11/2003 | Jonsson et al. ................ 293/102 |
| 2005/0151392 | A1 | * | 7/2005  | Yasukouchi et al. ...... 296/187.03 |
| 2008/0098601 | A1 | * | 5/2008  | Heinz et al. ................... 29/897.2 |
| 2008/0106107 | A1 |   | 5/2008  | Tan et al. |
| 2009/0159384 | A1 | * | 6/2009  | Chitteti et al. ................. 188/377 |
| 2010/0117385 | A1 | * | 5/2010  | Jenuwine et al. ............. 293/132 |

FOREIGN PATENT DOCUMENTS

| EP | 0856681 A1 | 8/1998 |
| EP | 2045142 A2 | 4/2009 |
| JP | 08-276804 A | 10/1996 |
| JP | 08-337183 A | 12/1996 |
| JP | 08-337183 A | 12/1996 |
| WO | 2006-024059 A | 3/2006 |

OTHER PUBLICATIONS

Extended European Search Report dated Dec. 3, 2009; Application No. 09011023.0-1264.

* cited by examiner

*Primary Examiner* — Glenn Dayoan
*Assistant Examiner* — Pinel Romain
(74) *Attorney, Agent, or Firm* — Studebaker & Brackett PC; Donald R. Studebaker

(57) ABSTRACT

A crash can with a cross-shaped cross section is provided between a side frame and a bumper beam. The crash can connects to an end portion of the side frame in a state where its four projecting portions are directed respectively in upper, lower, right and left directions. The bumper beam comprises a protruding portion which extends in the vehicle width direction. The right and left projecting portions are joined to a top face of the protruding portion and that the upper and lower projecting portions are joined to upper and lower faces of the protruding portion respectively. Plural beads are formed at the crash can at positions which avoid spot-joint positions. Accordingly, the impact energy can absorbed effectively by the crash can.

12 Claims, 6 Drawing Sheets

VEHICLE BODY STRUCTURE

BACKGROUND OF THE INVENTION

The present invention relates to a vehicle body structure of an automotive vehicle, and in particular, relates to a vehicle body structure in which a crash can is provided between a side frame and a bumper.

Conventionally, a technology to absorb the crash energy at the initial stage of the vehicle collision is known, which uses the buckling deformation of the crash can (crash box) which is provided between one end of the side frame which extends in the longitudinal direction of the vehicle and the bumper which extends in the vehicle width direction. Herein, the rigidity of the crash can is set to be smaller than that of the side frame.

Further, another technology to absorb the crash energy by using the buckling deformation of the side frame itself, not providing the crash can is known as well (see Japanese Patent Laid-Open Publication No. 8-337183). Herein, the side frame is made from relatively thin steel plates and has a cross section which is of a substantially cross shape, and recessed and/or projecting beads are formed at the wall faces of the side frame. Thereby, the stable buckling deformation in the bellows shape can be formed at the side frame by using the beads at the vehicle collision.

Meanwhile, the acting direction of an impact load which acts on the bumper when the automotive vehicle collides may not be constant, so that various forces, such as a pushing-up force, laterally-sliding force, and shearing force, may occur at the bumper. Accordingly, it may be preferable that the impact energy be transmitted to the crash can properly regardless of any acting direction of the impact load against the bumper in order for the crash can to perform its function effectively.

SUMMARY OF THE INVENTION

The present invention has been devised in view of the above-described matter, and an object of the present invention is to provide a vehicle body structure which can make the crash can absorb the impact energy effectively with the proper transmission of the impact energy to the crash can.

According to the present invention, there is provided a vehicle body structure, comprising a side frame extending in a longitudinal direction of a vehicle, and a bumper beam extending in a vehicle width direction, a crash can provided between an end portion of the side frame and the bumper beam, wherein the crash can has a cross section which is of a substantially cross shape and connects to the end portion of the side frame in such a manner that the crash can extends in the longitudinal direction of a vehicle in a state in which four projecting portions of the crash can are directed respectively in an upper direction, a lower direction, a right direction and a left direction of the vehicle, the bumper beam comprises a protruding portion which protrudes toward the side frame and extends in the vehicle width direction with a substantially closed cross section, and the crash can connects to the bumper beam in such a manner that the projecting portions of the crash can which are directed in the right and left directions are joined to a top face of the protruding portion respectively and that the projecting portions of the crash can which are directed in the upper and lower directions are joined to upper and lower faces of the protruding portion respectively.

According to the present invention, the projecting portions of the crash can which are directed in the right and left directions are joined to the top face of the protruding portion respectively and the projecting portions of the crash can which are directed in the upper and lower directions are joined to the upper and lower faces of the protruding portion respectively. Thereby, in case the laterally-sliding force acts on the bumper beam, that force can be properly restricted by the projecting portions of the crash can which are directed in the right and left directions. Further, in case the pushing-up force or the pulling-down act on the bumper beam, those forces can be properly restricted by the projecting portions of the crash can which are directed in the upper and lower directions. Meanwhile, in case the shearing force acts on the bumper beam, that force can be properly restricted by all these projecting portions of the crash can. Consequently, the impact load acting on the bumper beam can be efficiently transmitted to the crash can, thereby making the crash can perform its absorption function effectively.

According to an embodiment of the present invention, the protruding portion has a flat face portion which is located perpendicularly to a buckling axis of the crash can at least at a specified portion of the top face thereof to which the crash can is joined. Thereby, the impact load can be made act on the bumper beam properly in the vehicle width direction. Accordingly, the stable buckling deformation can be formed at the crash can properly.

According to another embodiment of the present invention, plural beads are formed at a specified portion of the crash can which is away from the flat face portion of the protruding portion. Thereby, the stable buckling deformation can be properly generated by the beads, thereby absorbing the impact energy effectively.

According to another embodiment of the present invention, the crash can comprises two members, each of which has a convex-shaped cross section with an open bottom face and comprises a first wall portion which extends along the buckling axis, a pair of second wall portions which connects to the first wall portion and extends perpendicularly to the first wall portion, a pair of third wall portions which connects to the second wall portion and extends perpendicularly to the second wall portion, and a pair of fourth wall portions which connects to the third wall portion and extends perpendicularly to the third wall portion, the two members of the crash can being joined to each other via the respective fourth wall portions which are disposed overlapping with each other and joined to each other, and the beads are formed only at the first wall portion and the pair of third wall portions. Thereby, the productivity improves because the beads are formed easily, and the impact energy can be absorbed more effectively because the stable buckling deformation of the crash can is obtained.

According to another embodiment of the present invention, the joining of the respective fourth wall portions is conducted by a spot joint which are applied to plural positions of the fourth wall portions along the vehicle longitudinal direction, and the beads are located between the spot-joint positions. Herein, when the fourth wall portions are deformed, a specified portion which is located between the beads formed at the third wall portions may be easily deformed. According to the present embodiment, since the specified portion is formed avoiding the spot-joint position which may be hard to deform (i.e., which may not deform easily), the stable buckling deformation can be obtained without receiving any improper influence of the spot joint.

According to another embodiment of the present invention, the spot-joint positions are located between a reverse-V-shaped portion and a V-shaped deforming portion of a bellows-shaped buckling deformation of the crash can which is caused by the beads. Thereby, the relatively large deformation of the crash can be generated without receiving any improper influence of the spot joint.

According to another embodiment of the present invention, the side frame includes a position support portion which has a cross section which is of a substantially cross shape, which corresponds to the crash can, at one end thereof, and an inside projection of the position support portion extends in the longitudinal direction of the vehicle and a length thereof is longer than that of an outside projection of the position support portion. Thereby, since the side frame includes the position support portion, the crash can is supported in the direction of the buckling axis of the crash can, so that the proper buckling deformation of the crash can be obtained effectively. Further, the structure of the position support portion is configured to be properly strong against bending even when the crash can has been collapsed completely and the crash energy comes to act on the side frame directly. Accordingly, it can be prevented that the position support portion would bend and its bent portion would interfere with an engine unit which is provided inside. Moreover, since the inside projection of the position support portion extends in the longitudinal direction of the vehicle and its length is longer than that of the outside projection of the position support portion, the side frame bends inward at a specified position where the terminal end of the outside projection of the position support portion is located, so that a rear portion of the side frame which is located behind the specified position projects outward in the vehicle width direction. Accordingly, the side frame can bend properly avoiding any interference with the engine unit provided inside of the side frame and absorb the impact energy effectively, thereby further improving the safety.

According to another embodiment of the present invention, a projection height of each of the inside and outside projections of the position support portion becomes gradually small toward the other end of the side frame from the one end of the side frame at the crash can provided. Thereby, a middle portion of the side frame which follows the position support portion has its relatively narrow width, which may preferably provide some space on both sides of the middle portion. Further, the impact energy can be so smoothly transmitted that the side frame can bend stably in a specified direction.

According to another embodiment of the present invention, a recessed bead is formed near a terminal end of the outside projection portion of the position support portion. Thereby, the stable bending of the side frame can be provided properly by this bead.

According to another embodiment of the present invention, a recessed bead is formed near a terminal end of the inside projection portion of the position support portion. Thereby, the stable bending of the side frame can be provided more properly by this bead.

Other features, aspects, and advantages of the present invention will become apparent from the following description which refers to the accompanying drawings.

DETAILED DESCRIPTION OF THE INVENTION

Figure 1:
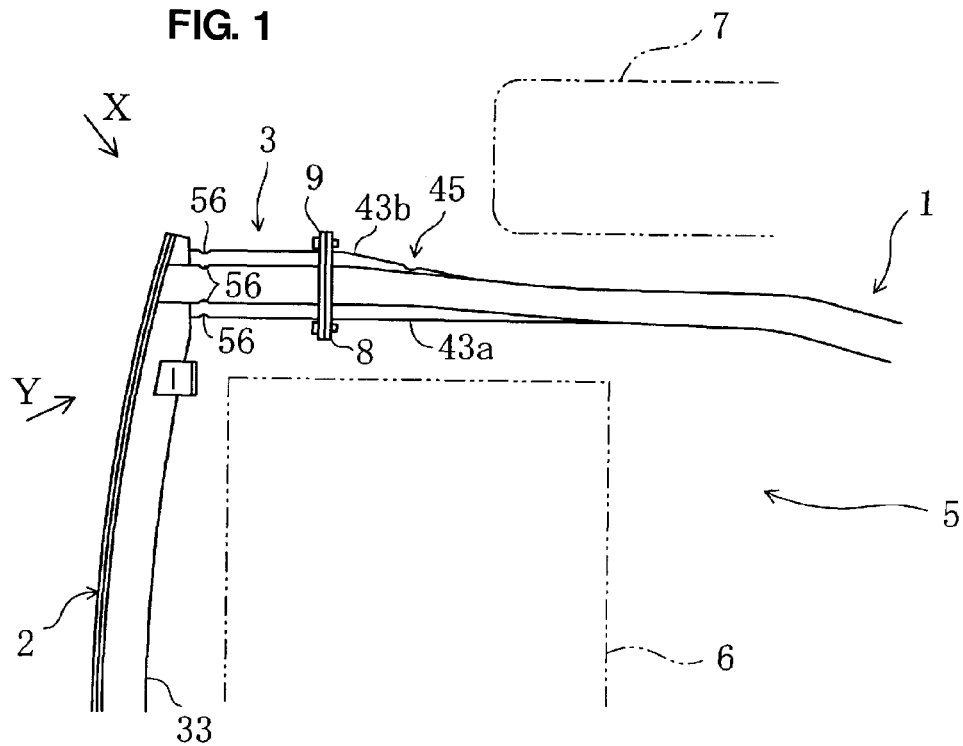
FIG. 1 is a plan view of a major portion of a vehicle to which a vehicle body structure according to the present invention is applied.

Hereinafter, a preferred embodiment of the present invention will be described referring to the drawings.

FIG. 1 shows a major portion of an automotive vehicle (a vehicle) equipped with a vehicle body structure according to the present invention. This figure shows a right half part of the vehicle body structure of the automotive vehicle, in which a side frame 1 extends in a longitudinal direction of the vehicle on the right side, a bumper beam 2 extends in a vehicle width direction, and a crash can 3 is provided between them.

Another side frame (not illustrated) is provided on the left side of the vehicle as well, and an engine room 5 is formed between the both side frames. An engine unit 6 which comprises an engine body and auxiliary parts of pumps and the like is mounted inside the engine room 5 near the bumper beam 2 and the side frame 1. A front wheel 7 is disposed on the outside of the side frame 1.

Herein, the both-side vehicle body structures of the vehicle front are symmetric and substantially the same, so describing the one on the left side will be omitted. Further, the longitudinal direction or the like which are described here generally mean the directions of the automotive vehicle illustrated in FIG. 1.

[Bumper Beam]

Figure 2:
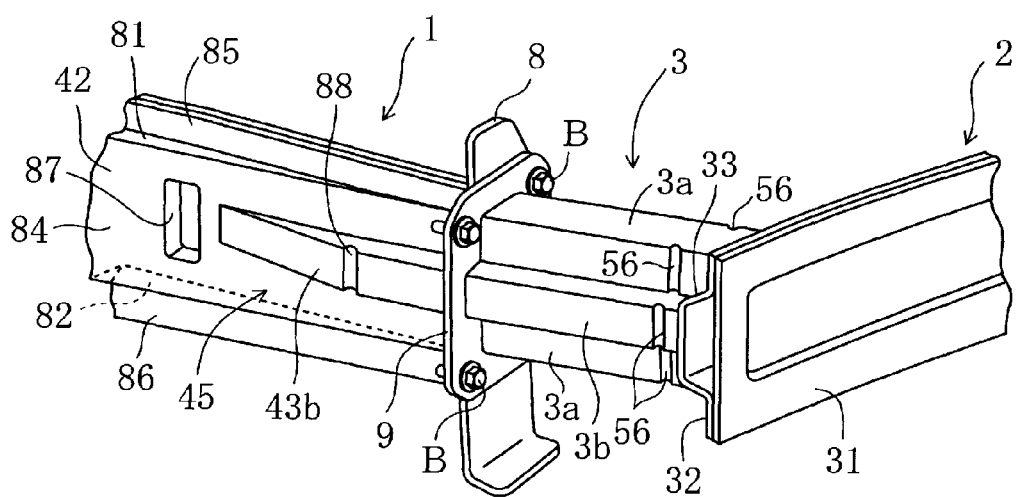
FIG. 2 is a schematic perspective view, when viewed in a direction of an arrow X of FIG. 1.

A bumper beam 2 has a closed cross section, which are formed by a beam plate 31 and a beam member 32, for reinforcing its rigidity as shown in FIG. 2. Specifically, the beam plate 31 is made of a steel plate which extends in the vehicle width direction. Meanwhile, the beam member 32 is made of a pressed steel member and has a projecting portion 33 which projects and extends in the vehicle width direction.

That is, the beam member 32 comprises, as shown specifically in FIG. 7, a top face portion 32a which extends in the vehicle width direction, a pair of projecting side face portions 32b, 32b which connects to both ends of the top face portion 32a respectively extending substantially perpendicularly to each other above and below the top face portion 32a, and a pair of flange face portion 32c, 32c which extends outward from the projecting side face portions 32c, 32c respectively. The projecting side face portions 32c, 32c are joined to the beam plate via welding. The beam member 32 will be described later.

[Side Frame]

The side frame 1 comprises, as shown in FIGS. 2, 3, 9 and 10, an inner member 41 which is disposed on the inside and an outer member 42 which is disposed on the outside, which are made of a relatively thick pressed steel plate, respectively. Upper and lower flanges of these members are joined to each other via spot joints to form a closed cross section of the side frame 1. The side frame includes a position support portion 45 which has a cross section which is of a substantially cross shape at its front end.

Specifically, the side frame 1 includes a frame body 1a which comprises an upper face portion 81, a lower face portion 82, which extend in the longitudinal direction, an inside face portion 83 which connects to both inside edges of the upper and lower face portions 81, 82, and an outside face portion 84 which connects to both outside edges of these portions 81, 82 similarly. The cross section of the frame body 1a is of a rectangular shape which a longer vertical length. An upper flange portion 85 extends upward from the upper face portion 81, and a lower flange portion 86 extends downward from the lower face portion 82.

At a front end portion of the inside face portion 83 is formed an inside projecting portion 43a which projects toward the inside extending longitudinally at a middle position of the inside face portion 83. Meanwhile, an outside projecting portion 43b which projects toward the outside extending longitudinally at a middle position of the outside face portion 84 is formed at a front end of the outside face portion 84. Thus, the position support portion 45 which has the cross-shaped section is formed at the front end portion of the side frame 1.

Figure 5:
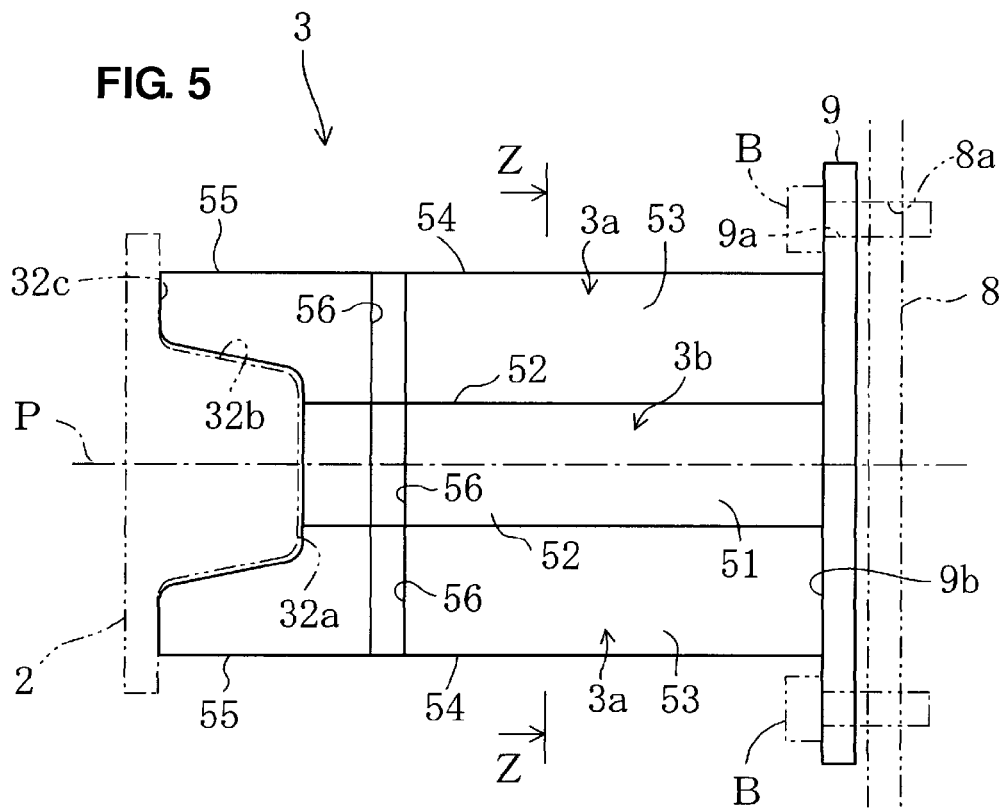
FIG. 5 is a side view of the crash can.

FIG. 5 shows a cross section of the position support portion 45. In this sectional view, a top face portion 100 of the inside projecting portion 43a has the length which is substantially the same as that of upper and lower inside face portions 101, 102 which are located above and below the inside projecting portion 43a and which is longer than that of both side face portions 103, 103 of the inside projecting portion 43a. A top face portion 104 of the outside projecting portion 43b, upper and lower inside face portions 105, 106, and both side face portions 103, 103 of the outside projecting portion 43b have similar relationships to the above. Meanwhile, the upper and lower face portions 81, 82 are longer than these respective face portions 100, . . . , 107.

The inside and outer projecting portions 43a, 43b extend from the front end to the rear end of the side frame 1. Specifically, the rear end of the inside projecting portion 43a is located rearward from the rear end of the outside projecting portions 43b, so that the inside projecting portions 43a is longer than the outside projecting portions 43b. Further, the inside and outer projecting portions 43a, 43b are formed such that their projection amount becomes gradually smaller from their front ends to their rear ends. Thereby, a middle portion of the side frame 1 which follows the position support portion 45 has its relatively narrow width, which may preferably provide some space on both sides of the middle portion.

Figure 9:
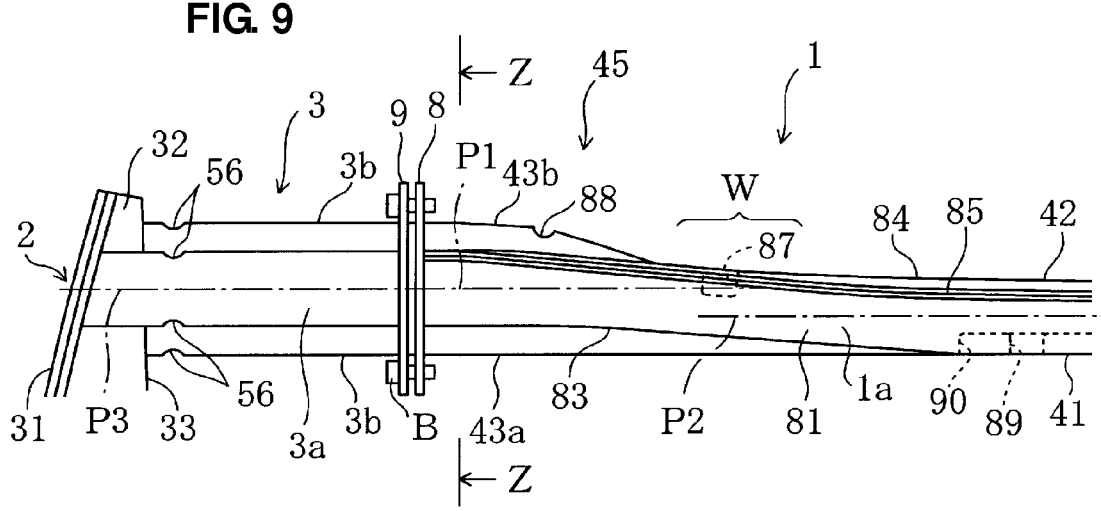
FIG. 9 is a plan view of a major portion of a side frame.
Figure 10:
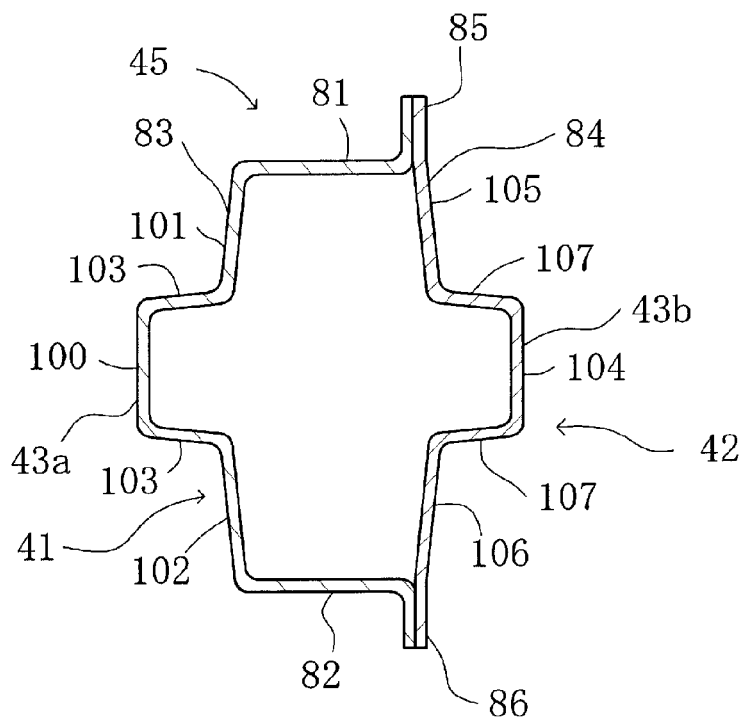
FIG. 10 is a sectional view taken along line Z-Z of FIG. 9.

The side frame 1 bends slightly in a curve shape at its middle so that its front end is offset a little outward as shown in FIG. 9. Specifically, as shown in the plan view of this figure, a center axial line of the frame body 1 which passes through its center in the longitudinal direction is configured such that an axial line P1 (a first axial line P1) of its front portion from its front end to its portion located near the rear end of the outside projecting portions 43b is located outward off an axial line P2 (a second axial line P2) of its rear portion located rearward from the above-described front portion. Thus, the side frame 1 has an offset at its area between the inside projecting portion 43a and the outer projecting portion 43b (an offset position W).

Further, an outside recessed bead portion 87 which extends vertically is formed at the outside face portion 84 near the rear end of the outside projecting portions 43b, specifically at a tip portion of a terminal end of the outside projecting portions 43b as shown in FIG. 2. A recessed bead 88 is formed at the middle of the outside projecting portions 43b in the longitudinal direction as well.

Figure 3:
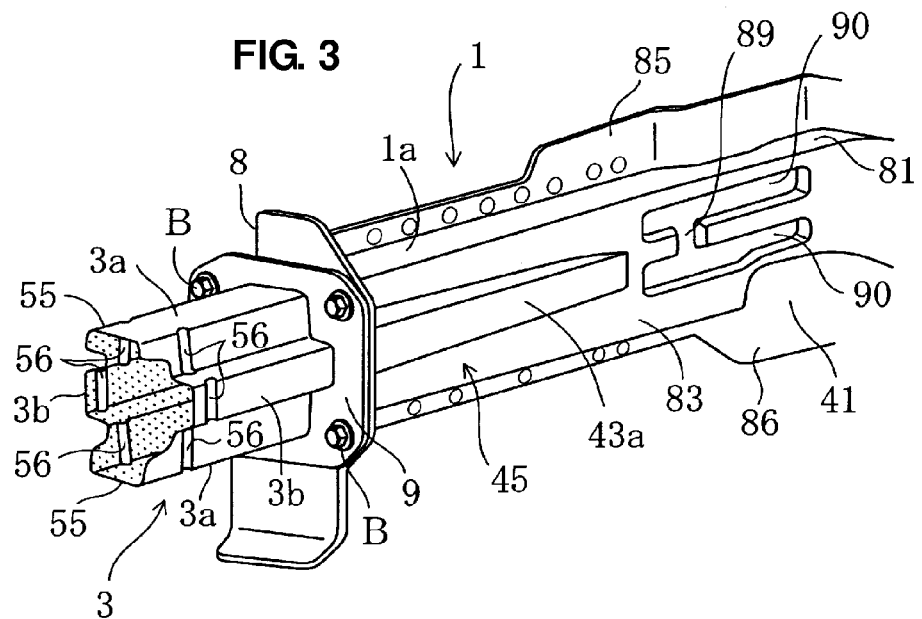
FIG. 3 is a schematic perspective view, when viewed in a direction of an arrow Y of FIG. 1, which omits illustration of a bumper beam.

Moreover, as shown in FIG. 3, an inside recessed bead portion 89 which extends vertically is formed at the inside face portion 84 near the rear end of the inside projecting portions 43a, specifically at a tip portion of a terminal end of the inside projecting portions 43a. Further, upper and lower reinforcing grooves 90, 90 which extend longitudinally are formed above and below the bead portion 89 so as to connect to the bead portion 89 respectively. Herein, the front ends of these reinforcing grooves 90, 90 are located in back of the rear end of the inside projecting portions 43a.

A fixing plate 8 with four bolt holes is joined to the front end of the position support portion 45 of the side frame 1 so as to face toward the front. At a front face of the fixing plate 8 is provided an attaching plate 9 which is of a rectangular shape and has four bolt holes corresponding to the blot holes of the fixing plate 8. The attaching plate 9 and the fixing plate 8 are joined firmly via bolts B which extend through these bolt holes and fastened with nuts.

Further, the crash can 3 is joined to the front face of the attaching plate 9 to absorb the impact of the vehicle frontal collision

[Crash Can]

Figure 4:
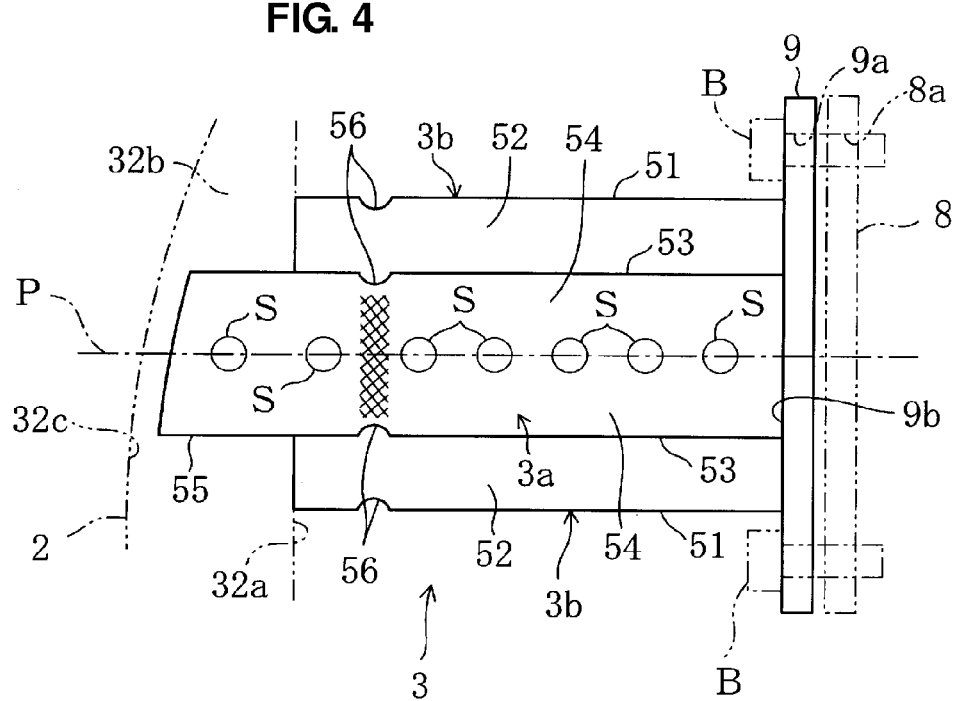
FIG. 4 is a plan view of a crash can.

The crash can 3, as shown in FIGS. 3 through 5, has a substantially cross-shaped section and extends in the longitudinal direction of the vehicle in a state in which its four projecting portions 3a, 3a, 3b, 3b are directed respectively in an upper direction, a lower direction, a right direction and a left direction of the vehicle. Its one end connects to the front end of the side frame 1 via the fixing plate 8 and the attaching plate 9. The other end connects to the end portion of the bumper beam 2.

Figure 6:
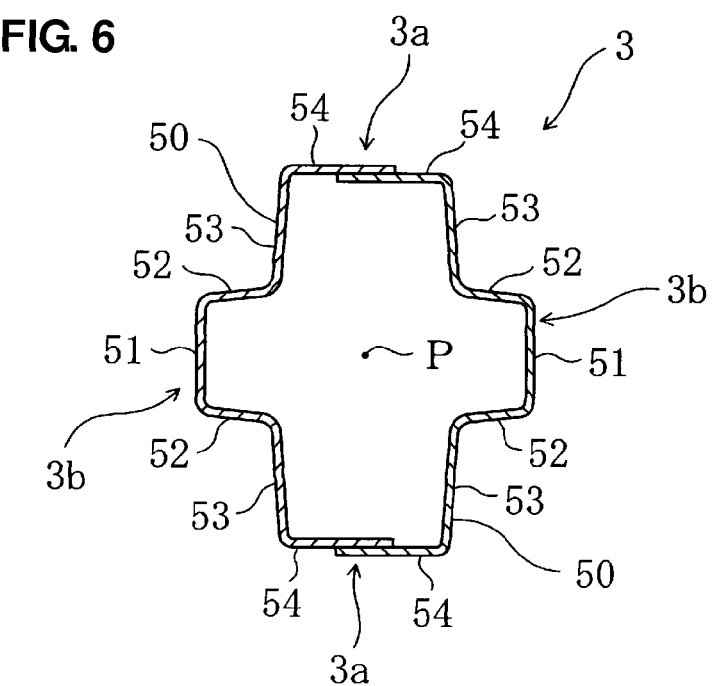
FIG. 6 is a sectional view taken along line Z-Z of FIG. 5.

The crash can 3 comprises two members 50, 50 which are made of a relatively thin pressed steel plate as shown in FIG. 6. Each of these members 50, 50 has a convex-shaped cross section with an open bottom face, and the crash can 3 is formed by joining the both sides of the bottom face to each other.

Specifically, the member 50 comprises a first wall portion 51 which extends along a buckling axis P, a pair of second wall portions 52, 52 which connects to the first wall portion 51 and extends perpendicularly to the first wall portion 51, a pair of third wall portions 53, 53 which connects to the second wall portion 52 and extends perpendicularly to the second wall portion 52, and a pair of fourth wall portions 54, 54 which connects to the third wall portion 53 and extends perpendicularly to the third wall portion 53.

Herein, in the sectional view, the length of the second wall portion 52 is shorter than that of the first wall portion 51, the third wall portion 53 has substantially the same length as the first wall portion 51, and the length of the fourth wall portions 54, 54 of the joined members 50, 50 which form the projecting portion 3a is the longest.

The two members 50, 50 are joined to each other via the respective fourth wall portions 54, 54 which are disposed overlapping with each other and joined to each other, which is conducted by a spot joint which are applied to plural positions (seven points in the present embodiment) along the buckling axis P (the spot joining points are denoted by reference characters S).

The crash can 3 of the present embodiment which is formed as described above is joined to the attaching plate 9 in such a manner that the pair of projecting portions 3a, 3a with the top faces 54, 54 is directed vertically and the pair of projecting portions 3b, 3b with the top faces 51, 51 is directed laterally.

The buckling axis P which passes through the longitudinal center of the crash can 3 is set to be perpendicular to the flat front face (attaching face 9b) of the attaching plate 9 and to overlap with the axis which passes through the longitudinal center of the position support portion 45 of the side frame 1. This is because the cash can 3 which is set as described above can properly buckle against the compressive load acting in the buckling axis P of the crash can 3 and thereby efficiently absorb the impact energy.

Meanwhile, the front end of the crash can 3 which is joined to the bumper beam 2 is also arranged in such a manner that it receives the projecting portion 33 of the bumper beam 2 therein so that the crash can 3 can effectively receive the load acting.

That is, as shown in FIGS. 3 through 5, the upper and lower projecting portions 3a, 3a of the crash can 3 on the side of the bumper beam 2 project forward so as to have forward extending portions 55, 55, front end edges of which contact the projecting side face portions 32b, 32b and the flange face portions 32c, 32c of the projecting portion 33 of the beam member 32. Front end edges of the right and left projecting portions 3b, 3b, meanwhile, contact the top face portion 32a of the projecting portion 33 of the beam member 32.

The top face portion 32a of the beam member 32, which is a flat face, is set to be perpendicular to the buckling axis P of the crash can 3. The vertical width of the top face portion 32a is arranged to be greater than the vertical width of the right and left projecting portions 3b, 3b of the crash can 3, i.e., the width of the first wall portion 51 according to the present embodiment. Herein, the flat face of the top face portion 32a just needs to be formed at the connecting portion to the crash can 3.

Figure 7:
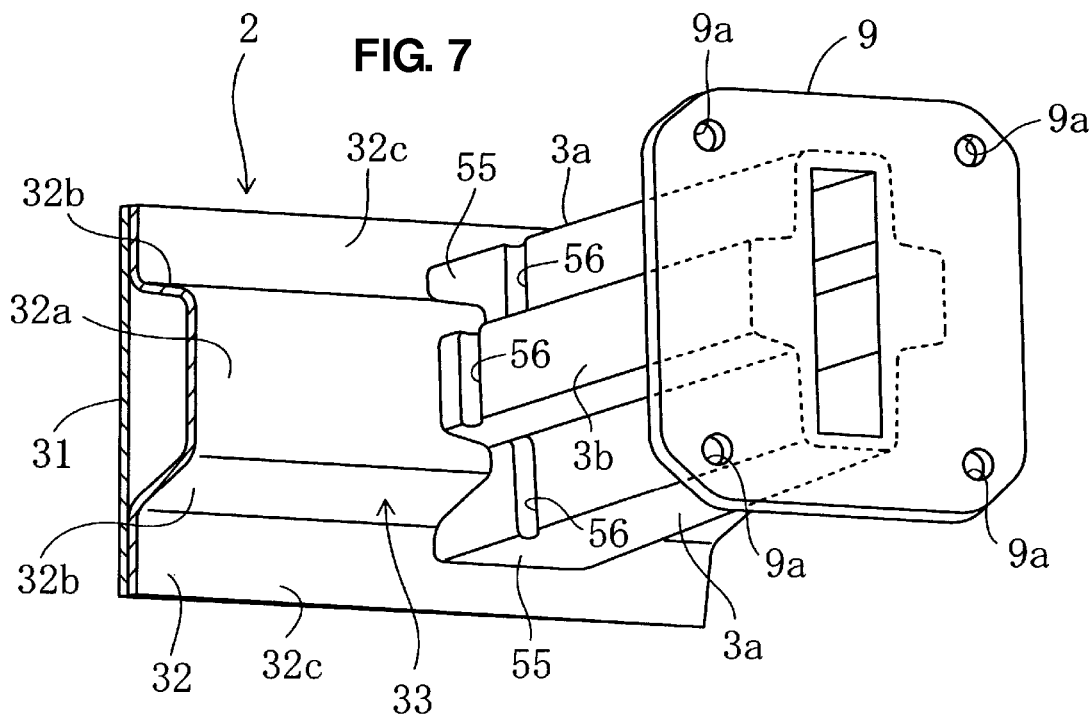
FIG. 7 is a schematic perspective view of a connection portion of the crash can and the bumper beam.

The front end portion of the crash can 3 is joined to the bumper beam 2 by applying welding along the front end edge of the crash can 3 as shown in FIG. 7.

Accordingly, the right and left projecting portions 3b, 3b of the crash can 3 are joined to the top face portion 32a of the protruding portion which is perpendicular to the buckling axis P. Thereby, in case the laterally-sliding force acts on the bumper beam 2, that force can be properly restricted by these projecting portions 3b, 3b of the crash can 3. Thus, the impact load can be transmitted to the crash can 3 efficiently. Further, in case the pushing-up force or the pulling-down act on the bumper beam 2, those forces can be properly restricted by the upper and lower projecting portions 3a, 3a of the crash can 3. Further, in case the shearing force acts on the bumper beam 2, that force can be properly restricted by all these projecting portions 3a, 3a, 3b, 3b of the crash can 3. Thus, the impact load can be transmitted to the crash can 3 efficiently. That is, since the impact energy can be transmitted to the crash can 3 properly even in case any load acts on the bumper beam 2 in any direction, the function of the crash can 3 can perform its absorption function effectively.

Additionally, the connecting portion of the right and left projecting portions 3b, 3b of the crash can 3 to the top face portion 32a of the bumper beam is perpendicular to the buckling axis P. Thereby, the impact load can be made act on the bumper beam 2 properly in the vehicle width direction. Accordingly, the stable buckling deformation can be formed at the crash can 3 properly.

Further, the beads are formed at the crash can 3 in order to provide the stable buckling deformation of the crash can 3 effectively. That is, as shown in FIGS. 4 and 5, plural recessed beads 56, 56, . . . (three beads at each side according to the present embodiment) are formed at a specified portion of the crash can 3 which is away from the top face portion 32a of the bumper beam 2.

Specifically, the beads 56 which extend in the vertical direction which is substantially perpendicular to the buckling axis P and recessed in a half-circular shape are formed only at the first wall portion 51 and the pair of third wall portions 53, 53. The beads 56 are located in line in a side view as shown in FIG. 5. These beads 56 cause a buckling deformation of the crash can 3 properly.

Figure 8:
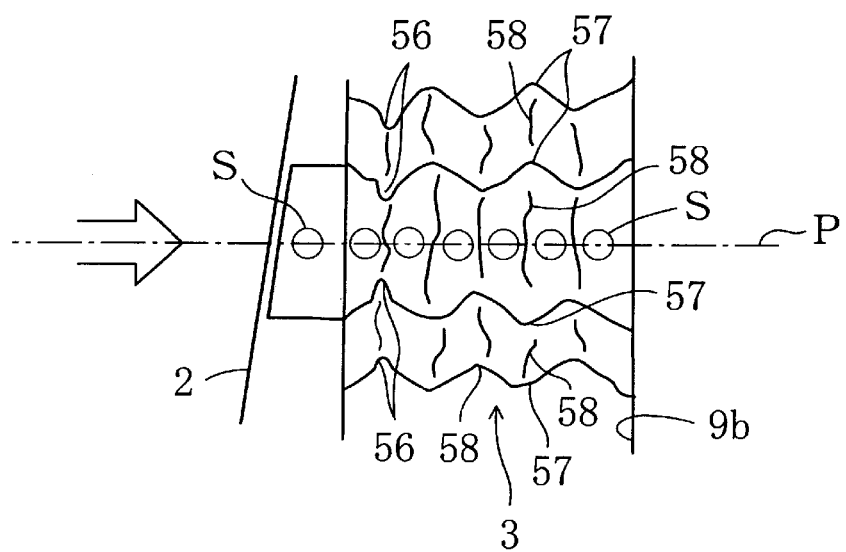
FIG. 8 is a schematic diagram of the crash can at its buckling deformation.

This buckling deformation of the crash can 3 is of a bellows shape such that there occurs a projecting portion (a reverse-V-shaped deforming portion 57) and a recessed portion (a V-shaped deforming portion 58) (see FIG. 8). In case of the crash can 3 with the cross-shaped cross section, the reversed-V-shaped deforming portions 57 and the V-shaped deforming portions 58 may be easily formed side by side as shown. Thus, by forming the beads 56 only at the first wall portion 51 and the pair of third wall portions 53, 53, the reverse-V-shaped deforming portions 57 may be formed easily at the second wall portion 52 between the bead 56 at the first wall portion 51 and the bead 56 at the third wall portion 53. Accordingly, the stable buckling deformation can be formed properly at the periphery of the crash can 3. Herein, it may be more preferably that a projecting bead is formed at the second wall portion 52, but that may not be superior in manufacturing because of an additional process necessary.

These beads 56 are formed so that the buckling deformation may not receive any improper influence of the spot welding. That is, the beads 56 are formed avoiding the joining wall which is comprised of the pair of fourth wall portions 54, 54 which are joined to each other via the spot welding. Further, the beads 56 are located between the spot-joint positions S as shown in FIG. 4. Herein, while a specified portion of the above-described joining wall between the beads 56, 56 formed at the third wall portions 53, 53 (illustrated by shady lines) may be easily deformed in the projecting shape, since the specified portion is formed avoiding the spot-joint positions S which may be difficult to deform, the stable buckling deformation can be obtained.

The spot-joint positions are located between the reverse-V-shaped deforming portions 57 and the V-shaped deforming portions 58 of the bellows-shaped buckling deformation of the crash can 3 which is caused by the beads 56.

FIG. 8 schematically shows a state in which the impact load acts on the crash can 3 in the buckling axis P and the crash can 3 has the buckling deformation. As shown in this figure, the bellows-shaped deformation with the reverse-V-shaped deforming portions 57 and the V-shaped deforming portions 58 which are formed side by side in the direction of the buckling axis P at the crash can 3. These greatly deforming portions are set to be located avoiding the spot-joint positions S which may be difficult to deform. Herein, since the position in the direction of the buckling axis P where the reverse-V-shaped deforming portions 57 and the V-shaped deforming portions 58 occur may be expected based on the thickness, shape or the like of the crash can 3, the spot joint may be properly applied avoiding such position. Accordingly, the stable buckling deformation of the crash can 3 can be generated without receiving any improper influence of the spot joint.

Herein, the crash can 3 may be disposed in such a manner that the fourth wall portions 54 are directed in the lateral direction and the first wall portions 51 are directed in the vertical direction so that the beads 56 are exposed upward and downward instead of the above-described embodiment. Further, the beads 56 may be formed so as to project from the wall face instead of the above-described recessed beads 56. In this case, the deformation style may be reverse to that according to the above-described embodiment.

Hereinafter, the operation of the vehicle body structure described above at the vehicle collision will be described.

Figure 11:
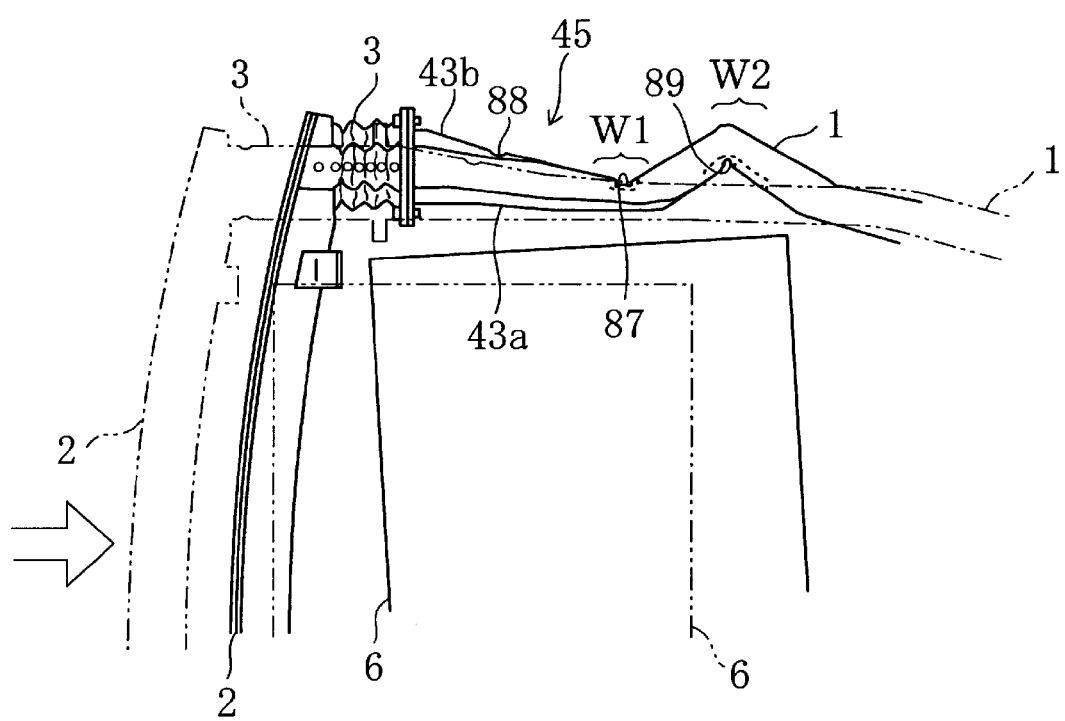
FIG. 11 is a schematic diagram of the side frame which is in its bending state.

FIG. 11, which corresponds to FIG. 1, shows a change of the state when the impact load acts on the bumper beam 2 from the front as shown by an arrow in this figure. Herein, the state before the vehicle collision is illustrated by broken lines, and the state after the vehicle collision is illustrated by solid lines.

At the initial stage of the vehicle collision, the impact energy is first absorbed by the buckling deformation of the crash can 3. The specific operation function of the crash can 3 is as described above.

Then after the crash can 3 has collapsed completely, the impact energy comes to act on the side frame 1 directly because the crash can 3 will lose its impact absorbing function. Herein, the side frame 1 can absorb the impact energy effectively, avoiding any interference with the engine unit 6 located on the inside. That is, since the position support portion 45 of the side frame 1 has the structure which is strong against bending, it can be effectively prevented that the position support portion 45 bends and thereby interfere with the engine unit 6.

Further, since the front end portion of the side frame 1 which forms the position support portion 45 is slightly offset outward (toward the vehicle outside), the position support portion 45 may bend easily outward at its offset position W, but it may not bend easily inward (toward the vehicle inside).

Moreover, the outside bead portion 87 is formed at the offset position W near the terminal end of the outside projection portion 43*b*, and the inside projection 43*a* extends in the longitudinal direction with its length which is longer than that of the outside projection 43*b*. Accordingly, the side frame 1 may bend easily inward at the offset position W (inward bending position W1). The inside bead 89 is formed at a position (outward bending position W2) near the terminal end of the inside projection portion 43*a* which is located in back of the inward bending position W1. Thereby, the side frame 1 may bend easily outward at this position.

Further, since the projection height of each of the inside and outside projections 43*a*, 43*b* becomes gradually small toward the rear end of the side frame 1, the impact energy can be so smoothly transmitted that the side frame 1 can bend stably in the specified direction. Herein, since the front end of the side frame 1 is configured not to bend easily by the position support portion 45, the amount of inward bending projection of the inward bending position W1 will be relatively small, while the mount of outward bending projection of the outward bending position W1 will be relatively large. Since the outward bending position W2 is located at the position of the side frame 1 which may easily interfere with a rear end portion of the engine unit 6 which has been made move rearward at the vehicle collision, any improper interference of the side frame 1 with the engine unit 6 can be effectively avoided. Thereby, any problem with the engine unit 6 which may be caused by interference can be prevented properly.

Thus, the side frame 1 is configured to bend in the specified direction at the specified portion, so that the impact energy acting on the side frame 1 can be effectively absorbed, avoiding any improper interference with the engine unit 6.

Further, since the bead 88 is formed at the outside projecting portion 43*b*, the position support portion 45 may bend in such a manner that its rear portion projects outward, the avoidance of the interference with the engine unit 6 can be provided surely.

The present invention should not be limited to the above-described embodiment, and any other modifications and improvements may be applied within the scope of a spirit of the present invention.

What is claimed is:
1. A vehicle body structure, comprising:
   a side frame extending in a longitudinal direction of a vehicle;
   a bumper beam extending in a vehicle width direction, the bumper beam including a protruding portion, which protrudes toward the side frame, and having a substantially closed cross section extending in a vehicle width direction; and
   a crash can provided between an end portion of the side frame and the bumper beam and extending in the longitudinal direction of a vehicle, the crash can including upper and lower projecting portions which are directed in upper and lower directions, respectively, and right and left projecting portions which are directed in right and left directions, respectively, so as to have a cross section which is of a substantially cross shape, respective front ends of the upper and lower projecting portions extending forwardly beyond respective front ends of the right and left projecting portions such that the upper and lower projecting portions have forward extending portions at front portions thereof, respectively, and a recess portion is formed at a front end portion of the crash can by the front ends of the right and left projecting portions and said forward extending portions of the upper and lower projecting portions,
   wherein the front end portion of said crash can is connected to said bumper beam such that the protruding portion of said bumper beam is received in said recess portion at the front end portion of the crash can, and the front ends of the right and left projecting portions are joined to a top face of the protruding portion of the bumper bean and the forward extending portions of the upper and lower projecting portions are joined to upper and lower faces of the protruding portion of the bumper beam, respectively.

2. The vehicle body structure of claim 1, wherein said protruding portion has a flat face portion which is located perpendicularly to a buckling axis of said crash can at least at a specified portion of the top face thereof to which the crash can is joined.

3. The vehicle body structure of claim 2, wherein plural beads are formed at a specified portion of said crash can which is away from said flat face portion of the protruding portion.

4. The vehicle body structure of claim 3, wherein said crash can comprises two members, each of which has a convex-shaped cross section with an open bottom face and comprises a first wall portion which extends along the buckling axis, a pair of second wall portions which connects to the first wall portion and extends perpendicularly to the first wall portion, a pair of third wall portions which connects to the second wall portion and extends perpendicularly to the second wall portion, and a pair of fourth wall portions which connects to the third wall portion and extends perpendicularly to the third wall portion, the two members of the crash can being joined to each other via the respective fourth wall portions which are disposed overlapping with each other and joined to each other, and said beads are formed only at the first wall portion and the pair of third wall portions.

5. The vehicle body structure of claim 4, wherein said joining of the respective fourth wall portions is conducted by a spot joint which are applied to plural positions of the fourth wall portions along the vehicle longitudinal direction, and said beads are located between the spot-joint positions.

6. The vehicle body structure of claim 5, wherein said spot-joint positions are located between a reverse-V-shaped deforming portion and a V-shaped deforming portion of a bellows-shaped buckling deformation of the crash can which is caused by said beads.

7. The vehicle body structure of claim 1, wherein said side frame includes a position support portion which has a cross section which is of a substantially cross shape, which corresponds to said crash can, at one end thereof, and an inside projection of the position support portion extends in the longitudinal direction of the vehicle and a length thereof is longer than that of an outside projection of the position support portion.

8. The vehicle body structure of claim 7, wherein a projection height of each of said inside and outside projections of the position support portion becomes gradually small toward the other end of the side frame from the one end of the side frame at the crash can provided.

9. The vehicle body structure of claim 7, wherein a recessed bead is formed near a terminal end of said outside projection portion of the position support portion.

10. The vehicle body structure of claim 9, wherein a recessed bead is formed near a terminal end of said inside projection portion of the position support portion.

11. A vehicle body structure, comprising:
a side frame extending in a longitudinal direction of a vehicle and including a position support portion at a front end portion thereof, the position support portion including an inside projection which is formed at an inside face portion of the side frame to project inward at a middle position of the inside face portion and an outside projection which is formed at an outside face portion of the side frame to project outward at a middle position of the outside face portion so as to have a cross section which is of a substantially cross shape;
a bumper beam extending in a vehicle width direction; and
a crash can provided between an end portion of the side frame and the bumper beam and extending in the longitudinal direction of a vehicle, the crash can including upper and lower projecting portions which are directed in upper and lower directions, respectively, and right and left projecting portions which are directed in right and left directions, respectively, so as to have a cross section which is of a substantially cross shape,
wherein the inside and outside projections of the position support portion of said side frame extend rearward in the longitudinal direction of the vehicle, respectively, and a terminal end of the inside projection is located in back of a terminal end of the outside projection such that a length of the inside projection is longer than that of the outside projection of the position support portion, whereby the side frame bends inward at a point of the terminal end of the outside projection in a vehicle collision.

12. A vehicle body structure, comprising:
a side frame extending in a longitudinal direction of a vehicle and including a position support portion at a front end portion thereof, the position support portion including an inside projection which is formed at an inside face portion of the side frame to project inward at a middle position of the inside face portion and an outside projection which is formed at an outside face portion of the side frame to project outward at a middle position of the outside face portion so as to have a cross section which is of a substantially cross shape;
a bumper beam extending in a vehicle width direction; and
a crash can provided between an end portion of the side frame and the bumper beam and extending in the longitudinal direction of a vehicle, the crash can including upper and lower projecting portions which are directed in upper and lower directions, respectively, and right and left projecting portions which are directed in right and left directions, respectively, so as to have a cross section which is of a substantially cross shape,
wherein the inside and outside projections of the position support portion of said side frame extends extend rearward in the longitudinal direction of the vehicle, respectively, and a terminal end of the inside projection is located in back of a terminal end of the outside projection such that a length of the inside projection is longer than that of the outside projection of the position support portion, a recessed bead is formed near the terminal end of said outside projection portion of the position support portion, and a recessed bead is formed near the terminal end of said inside projection portion of the position support portion, whereby the side frame bends inward at a point of the terminal end of the outside projection and bends outward at another point of the terminal end of the inside projection in a vehicle collision.

* * * * *